US011809567B2

(12) United States Patent
Liu et al.

(10) Patent No.: US 11,809,567 B2
(45) Date of Patent: Nov. 7, 2023

(54) SYSTEM AND METHOD OF AUTHENTICATING FIRMWARE FOR AN INFORMATION HANDLING SYSTEM

(71) Applicant: Dell Products L.P., Round Rock, TX (US)

(72) Inventors: Wei G Liu, Austin, TX (US); Jayanth Raghuram, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 277 days.

(21) Appl. No.: 17/076,371

(22) Filed: Oct. 21, 2020

(65) Prior Publication Data
US 2022/0121749 A1    Apr. 21, 2022

(51) Int. Cl.
*G06F 21/57*    (2013.01)
*H04L 9/32*    (2006.01)

(52) U.S. Cl.
CPC .......... *G06F 21/575* (2013.01); *H04L 9/3236* (2013.01); *H04L 9/3247* (2013.01); *H04L 9/3263* (2013.01)

(58) Field of Classification Search
CPC ... G06F 21/575; H04L 9/3236; H04L 9/3247; H04L 9/3263
See application file for complete search history.

(56) References Cited

U.S. PATENT DOCUMENTS

| 2008/0126779 | A1* | 5/2008 | Smith | G06F 21/575 |
| | | | | 713/2 |
| 2019/0332775 | A1* | 10/2019 | Savage | H04L 63/0823 |
| 2020/0374130 | A1* | 11/2020 | Strong | H04L 9/006 |

FOREIGN PATENT DOCUMENTS

EP    0872080 B1 * 12/2010

OTHER PUBLICATIONS

Cooper, D. et al. "Internet X.509 Public Key Infrastructure Certificate and Certificate Revocation List (CRL) Profile." Network Working Group, May 2008.

(Continued)

*Primary Examiner* — Noura Zoubair
*Assistant Examiner* — Mayasa A. Shaawat
(74) *Attorney, Agent, or Firm* — McDermott Will & Emery LLP (57) ABSTRACT

In one or more embodiments, one or more systems, one or more methods, and/or one or more processes may retrieve a first hash value of a key manifest public key from a one time programmable memory medium; determine a second hash value of the key manifest public key; retrieve a third hash value of an initial boot block from the boot policy manifest; determine a fourth hash value of the initial boot block; determine that the third hash matches the fourth hash value; execute the initial boot block; validate subordinate certificates with a root certificate; determine firmware hash values respectively from the firmware volumes; decrypt signatures respectively associated with the firmware volumes to obtain respective decrypted signatures, in which the signatures are decrypted with public encryption keys of the respective subordinate certificates; determine that the firmware hash values respectively match the decrypted signatures; and execute the firmware volumes.

20 Claims, 7 Drawing Sheets

(56) References Cited

OTHER PUBLICATIONS

Farrell, S. et al. "An Internet Attribute Certificate Profile for Authorization." Internet Engineering Task Force (IETF), Jan. 2010.
"Series X: Data Networks and Open System Communications—Directory. Information technology—Open systems interconnection—The Directory: Public-key and attribute certificate frameworks." International Telecommunication Union X.509, 2000.
"Platform Initialization (PI) Specification—vol. 1: Pre-EFI Initialization Core Interface." Version 1.6, UEFI, May 2017.
Schneier, Bruce. "Applied Cryptography: Protocols, Algorithms, and Source Code in C." Second Edition, 1996.
Knight, Shawn. "AMI BIOS source code and UEFI signing key found on public FTP." Retrieved from url: https://www.techspot.com/news/52171-ami-bios-source-code-and-uefi-signing-key-found-on-public-ftp.html, Apr. 8, 2013.

* cited by examiner

SYSTEM AND METHOD OF AUTHENTICATING FIRMWARE FOR AN INFORMATION HANDLING SYSTEM

BACKGROUND

Field of the Disclosure

This disclosure relates generally to information handling systems and more particularly to authenticating firmware for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may retrieve a first hash value of a key manifest public encryption key from a one time programmable non-volatile memory medium of an information handling system; may determine a second hash value of the key manifest public encryption key; after determining that the first hash value matches the second hash value, may retrieve a third hash value of an initial boot block from the boot policy manifest; may determine a fourth hash value of the initial boot block; may determine that the third hash matches the fourth hash value; in response to determining that the third hash matches the fourth hash value, may execute the initial boot block; may validate multiple subordinate certificates, associated with respective multiple firmware volumes, with a root certificate; after executing the initial boot block: may determine multiple firmware hash values respectively from the multiple firmware volumes; may decrypt multiple signatures respectively associated with the multiple firmware volumes to obtain respective multiple decrypted signatures, in which the multiple signatures are decrypted with multiple public encryption keys of the respective multiple subordinate certificates; may determine that the multiple firmware hash values respectively match the multiple decrypted signatures; and in response to determining that the multiple firmware hash values respectively match the multiple decrypted signatures, may execute the multiple firmware volumes.

In one or more embodiments, a platform controller hub may include the one time programmable non-volatile memory medium. In one or more embodiments, the one or more systems, the one or more methods, and/or the one or more processes may further, before validating the multiple subordinate certificates, associated with the respective multiple firmware volumes, with the root certificate: retrieve a fifth hash value of a root certificate public encryption key from the boot policy manifest; determine a sixth hash value of the root certificate public encryption key; and determine that the fifth hash matches the sixth hash value. In one or more embodiments, the one or more systems, the one or more methods, and/or the one or more processes may further, before retrieving the fifth hash value of the root certificate public encryption key from the boot policy manifest: retrieve a seventh hash value of a boot policy manifest public encryption key from the key manifest; determine an eighth hash value of the boot policy manifest public encryption key; and determine that the seventh hash value matches the eighth hash value.

In one or more embodiments, the one or more systems, the one or more methods, and/or the one or more processes may further: write the hash value of the key manifest public encryption key to the one time programmable memory medium. In one or more embodiments, the one or more systems, the one or more methods, and/or the one or more processes may further: validate multiple attributes of the multiple subordinate certificates with multiple object identifiers. In one or more embodiments, the one or more systems, the one or more methods, and/or the one or more processes may further: determine multiple public encryption key hash values of multiple public encryption keys of the multiple subordinate certificates; determine that at least one public encryption key hash value of the multiple public encryption key hash values matches at least one hash value of multiple hash values of a revocation list; and determine at least one subordinate certificate associated with the at least one hash value of the multiple hash values of the revocation list. In one or more embodiments, to execute the multiple firmware volumes, the one or more systems, the one or more methods, and/or the one or more processes may further execute the multiple firmware volumes without executing at least one firmware volume of the multiple firmware volumes associated with the at least one subordinate certificate associated with the at least one hash value of the multiple hash values of the revocation list.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a platform controller hub (PCH) may include a one time programmable (OTP) non-volatile memory medium. For example, the OTP non-volatile memory medium may be programmed with a hash value of a master public encryption key. For instance, the hash value of the master public encryption key may head up a root of trust of an information handling system. In one or more embodiments, a non-volatile memory medium of the information handling system may store a key manifest. The key manifest may be digitally signed with a master original equipment manufacturer (OEM) private encryption key. For example, digitally signing the key manifest may include determining a hash value of the key manifest and encrypting, with the OEM private encryption key, the hash value of the key manifest to obtain a digital signature of the key manifest.

In one or more embodiments, the key manifest may delegate authority to a boot policy manifest key, which may authorize processor instructions of an initial boot block (IBB) to be executed by a processor of the information handling system. For example, a reset vector of the processor may execute the processor instructions of the IBB. For instance, the reset vector of the processor may execute the processor instructions of the IBB before another processor instruction module of information handling system firmware. In one or more embodiments, if the processor instructions of the IBB fail an authentication process, the information handling system may shut down and/or may not be permitted to continue with a boot process.

In one or more embodiments, the information handling system firmware may include multiple processor instruction modules. In the root of trust, each processor instruction module may include a hash value of a next processor instruction module to be executed in a boot sequence. For example, the processor instruction module may authenticate the next processor instruction module based at least on the hash value of the next processor instruction module before permitting execution of the next processor instruction module.

In one or more embodiments, the IBB may be signed by a private encryption key of the OEM, which may pose an issue for an original design manufacturer (ODM) developing at least a portion of the information handling system firmware since the ODM may not have access to the private encryption key of the OEM to sign the IBB, the key manifest, or the boot policy manifest. In one or more embodiments, to permit an ODM developer to program an information handling system of the OEM, one or more back doors may be placed in one or more development releases of information handling system firmware. Implementing a back door may involve removing a jumper on a motherboard of the information handling system, utilizing an internal Unified Extensible Firmware Interface (UEFI) shell-based flash utility, hiding command line parameters, and/or utilizing a ROM (read-only memory) emulator, among others. Even though the one or more back doors may patched before the one or more development releases of information handling system firmware are released as one or more production information handling system firmware releases, there may be a chance that a backdoor was not shut before releasing the information handling system as a production release.

In one or more embodiments, a private encryption key and a signing utility may be included in source code of information handling system firmware, but this may pose a security risk if the source code becomes leaked or unintentionally released. For example, with the private encryption key and the signing utility, malicious information handling system firmware updates (e.g., malware) may be validated and installed on information handling systems.

In one or more embodiments, a root certificate may be anchored in a boot policy manifest. For example, the root certificate may be issued by an OEM certificate authority. In one or more embodiments, a hash value of a public encryption key of the root certificate may be stored by a secure boot system boot policy manifest. In one example, a secure boot system may include an Intel Boot Guard. In another example, a secure boot system may include an AMD Platform Secure Boot. A root of trust verification may verify the hash value of the public encryption key of the root certificate. In one or more embodiments, the root certificate may be utilized to sign any number of subordinate public encryption keys by the OEM certificate authority. A certificate store area may be allocated in a non-volatile memory medium that stores information handling system firmware. The certificate store area may be securely updated during boot time or runtime using information handling system firmware tools, which may permit addition, deletion, revocation, and/or retrieval of stored subordinate certificates.

In one or more embodiments, subordinate public key infrastructure (PKI) key pairs may be hosted on a signing server, which may be managed by a subordinate key owner (e.g., an ODM). A hash value of a public encryption key of the root certificate may be stored in a platform manufacturers element section of a boot policy manifest, which may be verified by a root of trust verification. In one or more embodiments, a subordinate certificate may include one or more custom X.509 attributes represented by custom object identifiers (OIDs) or standard OIDs for permanent values. The OIDs may be derived from a motherboard or a platform, which may be accessible to the information handling system firmware. Examples of OIDs may include a motherboard ePPID, system service tag information, etc. In one or more embodiments, the OEM certificate authority may maintain a list of permitted OIDs. An ODM may include one or more OIDs in a certificate signing request (CSR).

In one or more embodiments, a root certificate verifier in information handling system firmware may first verify a root certificate against a hash value of the root certificate public encryption key stored in a platform manufacturer's element in a boot policy manifest. A subordinate certificate verifier (SCV) may retrieve subordinate certificates from a certificate store and may verify one or more subordinate certificates utilizing the public encryption key of the root certificate. In one or more embodiments, a list of hash values of public encryption keys of revoked subordinate certificate may be maintained in an IBB of the information handling system firmware. The list may permit revocation of one or more certificates. In one or more embodiments, a revocation list may also be added via a subordinate certificate. In one or more embodiments, the SCV may revoke a subordinate certificate. In one example, the SCV may revoke a subordinate certificate based at least on information associated with the subordinate certificate included in a revocation list. In another example, the SCV may revoke a subordinate certificate based at least on a validity period of the subordinate certificate. In one or more embodiments, a validity period of the subordinate certificate may be determined based at least on a time value from a baseboard management controller.

In one or more embodiments, the SCV may verify one or more object identifier (OID) values of a subordinate certificate against values fetched from platform entities and may attest the subordinate certificate. After the SCV attests to the subordinate certificate, a public encryption key of the subordinate certificate may be further utilized by the SCV to attest respective hash values or a signature of information handling system firmware boot blocks. The SCV may continue or stop an information handling system firmware boot process based at least on a verification result.

In one or more embodiments, one or more error codes and/or one or more success codes during a verification process may be logged via the information handling system firmware and/or a remote access controller. If a certificate store becomes corrupted or if all subordinate certificates have expired, an information handling system firmware recovery process may be initiated via the remote access controller, which may program a non-volatile memory medium with information handling system firmware that includes one or more valid certificates. In one or more embodiments, a production information handling system firmware may be maintained for a period of its lifetime, a validity period may not expire on a production information handling system firmware. The information handling system firmware may be used in a recovery process if needed.

In one or more embodiments, ODM information handling system firmware developers may generate a subordinate CSR to include one or more allowed OID name value pairs and may provide the subordinate CSR to the OEM certificate authority (CA). The OEM CA may sign the subordinate certificate request with a fixed validity period utilizing a root certificate private encryption key and may generate the subordinate certificate. The ODM information handling system firmware developer may sign one or more PEI (pre-EFI) firmware volumes and/or one or more DXE (driver execution environment) firmware volumes using a subordinate private encryption key and may include the one or more signed subordinate certificates in the certificate store in an ODM information handling system firmware image during a build process.

In one or more embodiments, the ODM may provision a signing server to generate one or more CSR requests for subordinate/ODM keys. In this fashion, a need for a backdoor for ODM information handling system firmware developers to develop information handling system firmware for the OEM may be eliminated. In one or more embodiments, even if a development information handling system firmware is leaked or if a signing server of the ODM becomes compromised, malicious and/or compromised information handling system firmware may not be executed on information handling systems of customers, since one or more subordinate certificates, respectively associated with one or more executable modules, may be revoked, which may not permit the one or more associated executable modules to be executed. In this fashion, compromised information handling system firmware may not be introduced to a production information handling system. In one or more embodiments, even if a development information handling system firmware is leaked or if a signing server of the ODM becomes compromised, the compromised information handling system firmware may not be able to be executed on information handling systems of customers because of the bonding OID differences.

Figure 1:
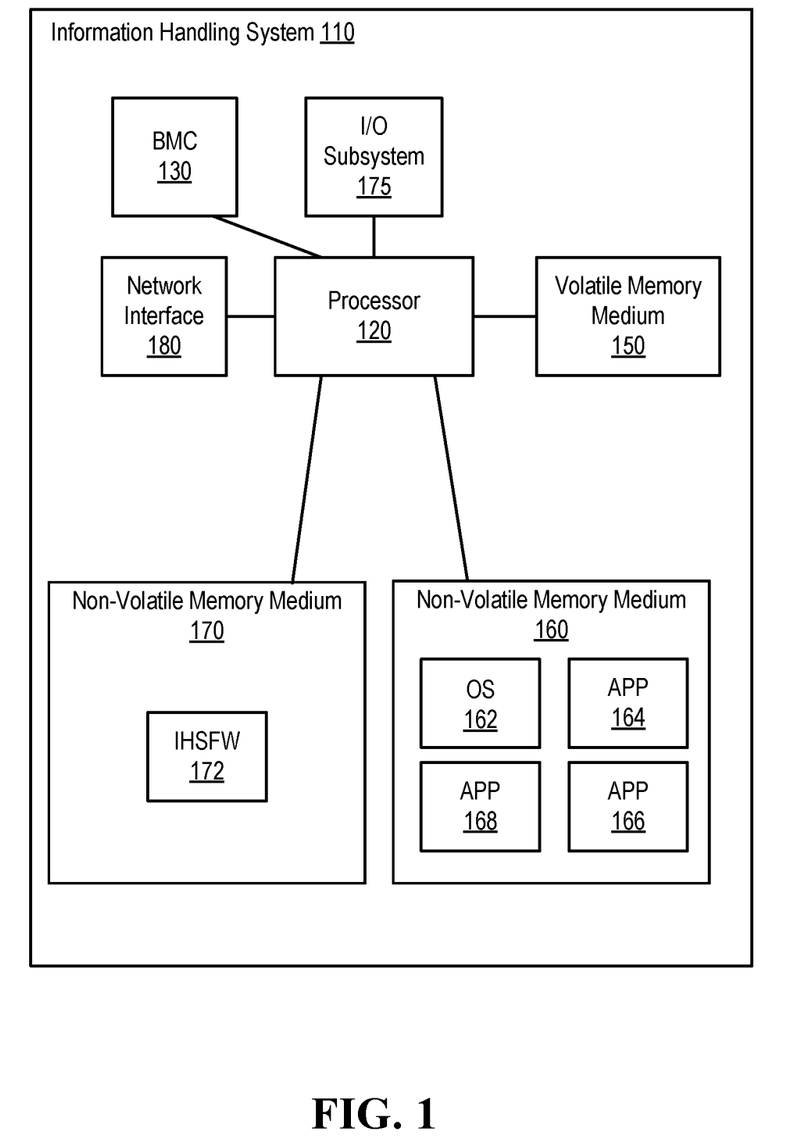
FIG. 1 illustrates an example of an information handling system, according to one or more embodiments.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, an embedded controller (BMC) 130, a volatile memory medium 150, non-volatile memory media 160 and 170, an I/O subsystem 175, and a network interface 180. As illustrated, BMC 130, volatile memory medium 150, non-volatile memory media 160 and 170, I/O subsystem 175, and network interface 180 may be communicatively coupled to processor 120.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of I/O BMC 130, subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a UEFI, and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be configured, coded, and/or encoded with instructions in accordance with at least a portion of one or more of systems, at least a portion of one or more flowcharts, at least a portion of one or more methods, and/or at least a portion of one or more processes described herein. In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 2A:
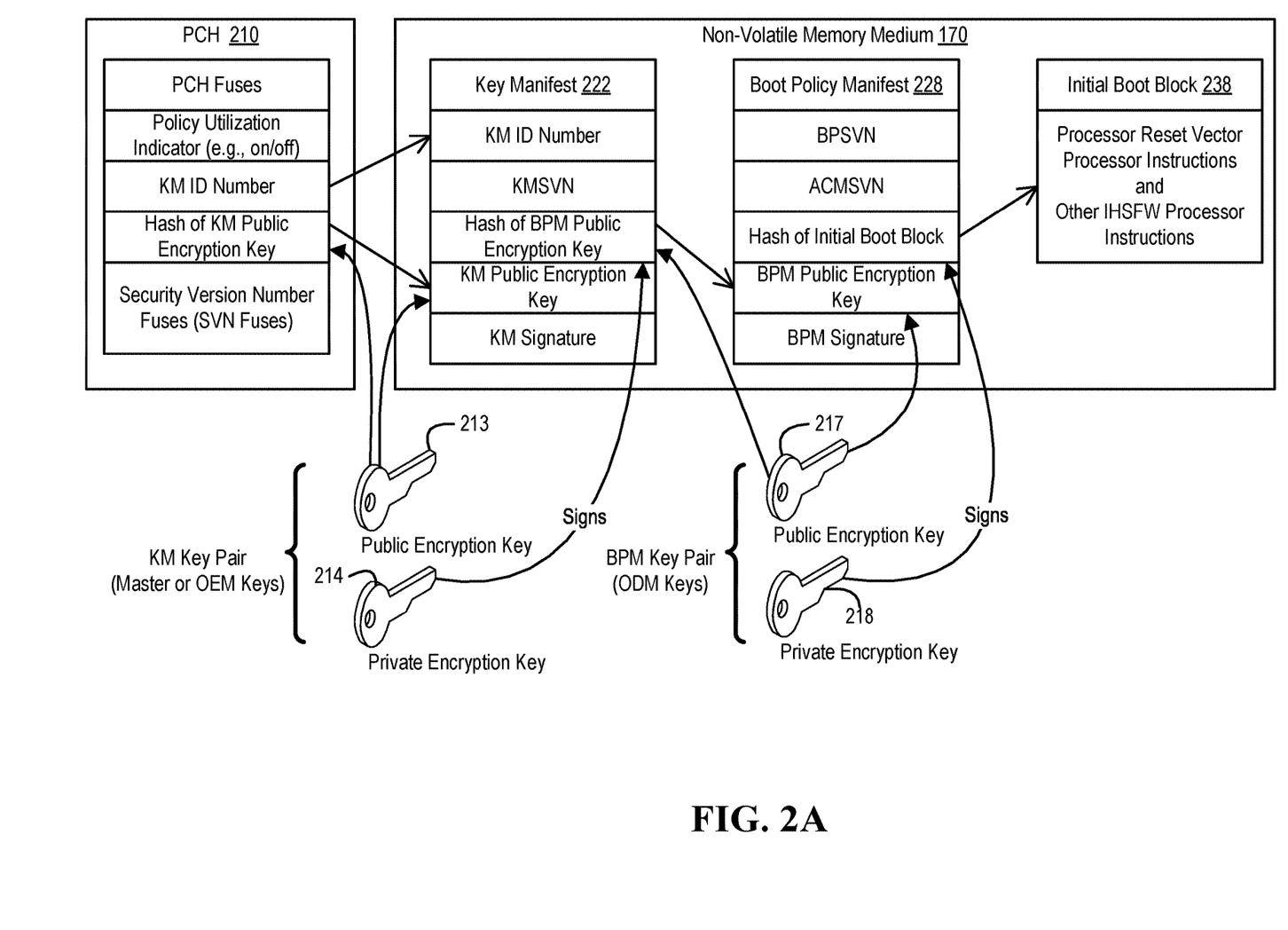
FIG. 2A illustrates an example of components of a secure boot system, according to one or more embodiments.

Turning now to FIG. 2A, an example of components of a secure boot system is illustrated, according to one or more embodiments. In one example, a secure boot system may include an Intel Boot Guard. In another example, a secure boot system may include an AMD Platform Secure Boot. As shown, a PCH 210 may include PCH fuses, a policy utilization indicator (e.g., on/off), a key manifest (KM) identification (ID) number, a hash value of a KM public encryption key, and security version number (SVN) fuses. Although not specifically illustrated, PCH 210 may be communicatively coupled to processor 120, according to one or more embodiments. For example, IHS 110 may include PCH 210.

In one or more embodiments, "fuses" may be an OTP non-volatile memory medium. For example, programming the OTP non-volatile memory medium with data may include "blowing the fuses" of the OTP non-volatile memory medium. For instance, a "fuse" may include a single data bit. The data bit may be read as a zero or a one. As an example, if a "fuse" is blown, an associated data bit may be zero. As another example, if a "fuse" is not blown, an associated data bit may be one. In one or more embodiments, a fuse may be blown to prevent additional fuses from being blown, which may result in a further alteration of the "fuses" (e.g., further alteration the OTP non-volatile memory medium).

In one or more embodiments, a hash value of data may be determined via a one-way hash of the data. In one example, a one-way hash function may be relatively easy to compute. For instance, for data x (e.g., a number, a string, binary data, etc.) and a one-way hash function h, h(x) may be relatively easy to compute. In another example, a one-way hash function may significantly difficult to reverse. For instance, for the one-way hash function h and a hash value h(z), z may be significantly difficult to compute. In one or more embodiments, significantly difficult to compute may mean that it may take years to compute z from h(z), even if multiple computers were applied to such a task.

In one or more embodiments, a one-way hash function may be considered collision free. For example, the one-way hash function may be injective or one-to-one. For instance, h(z1) and h(z2) may produce different values, where z1 and z2 are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-256, SHA-384, etc.), and a SNEFRU, among others. In one or more embodiments, a one-way hash function may be a composite function of two or more one-way hash functions. For example, a function h1 may include a MD 5 one-way hash function h2, a SHA one-way hash function h3, and a MD 5 one-way hash function h4, such that h1=h2(h3(h4(z))). For instance, a one-way hash function that is a composite function of two or more one-way hash functions may be considered to be and/or said to be strengthened.

In one or more embodiments, a private encryption key may be different from a public encryption key. For example, the private encryption key and the public encryption key may be asymmetric encryption keys. In one instance, data encrypted via the private encryption key may be decrypted via the public encryption key. In another instance, data encrypted via the public encryption key may be decrypted via the private encryption key. In one or more embodiments, the public encryption key may be derived from the private encryption key. In one or more embodiments, the private encryption key and the public encryption key may be utilized with an asymmetric encryption process, which may encrypt data to obtain encrypted data and/or may decrypt encrypted data to obtain unencrypted data.

As illustrated, non-volatile memory medium 170 may include a key manifest 222, a boot policy manifest 228, and an initial boot block 238. As shown, key manifest 222 may include the KM ID number, a key manifest SVN (KMSVN), a signed hash value of a boot policy manifest (BPM) public encryption key 217, a KM public encryption key 213, and a KM signature. In one or more embodiments, the hash value of the BPM public encryption key 213 may be signed with a KM private encryption key 214.

As illustrated, boot policy manifest 228 may include a boot policy SVN (BPSVN), a ACMSVN, a signed hash value of IBB 238, BPM pubic key 217, and a signature of boot policy manifest 228. In one or more embodiments, a hash value of IBB 238 may be signed with a BPM private encryption key 218. As shown, IBB 238 may include processor reset vector processor instructions and other IHSFW processor instructions. For example, the processor reset vector processor instructions may be executed after IHS 110 resets (e.g., begins a boot process). For instance, the processor reset vector processor instructions may be executed before the other IHSFW processor instructions.

Figure 2B:
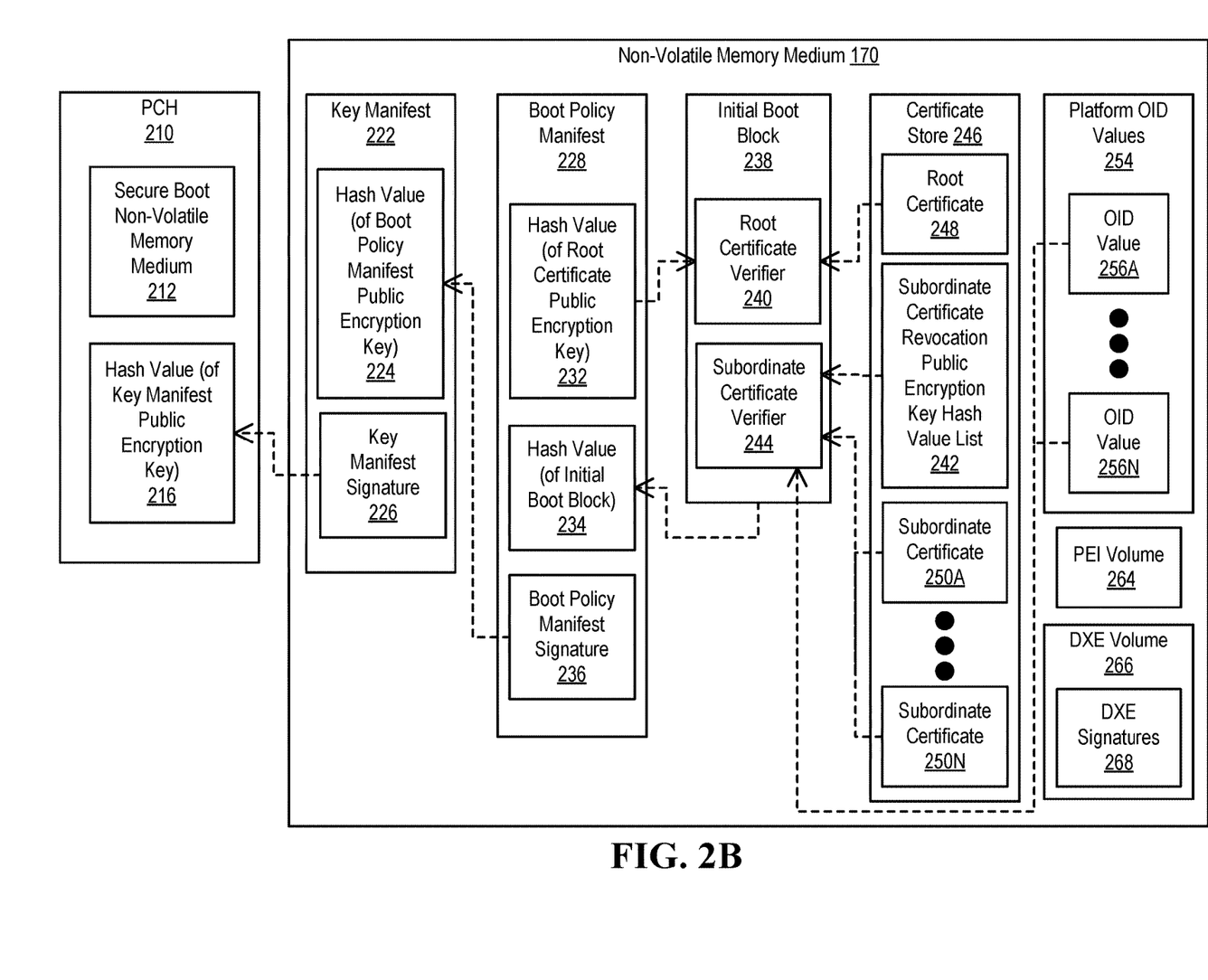
FIG. 2B illustrates another example of components of a secure boot system, according to one or more embodiments.

Turning now to FIG. 2B, another example of components of a secure boot system is illustrated, according to one or more embodiments. As shown, PCH 210 may include a secure boot non-volatile memory medium 212. For example, programming secure boot non-volatile memory medium 212 may include "blowing fuses". In one or more embodiments, secure boot non-volatile memory medium 212 may include an OTP non-volatile memory medium. Although not specifically illustrated, secure boot non-volatile memory medium 212 may communicatively coupled to processor 120, according to one or more embodiments. As illustrated, PCH 210 may include a hash value 216. For example, hash value 216 may be a hash value of a key manifest public encryption key.

As shown, non-volatile memory medium 170 may include key manifest 222, boot policy manifest 228, initial boot block 238, a certificate store 246, platform OID values 254, a PEI (pre-EFI) volume 264, and a DXE (driver execution environment) volume 266. In one or more embodiments, DXE volume 266 may include DXE signatures 268. For example, DXE signatures 268 may be respectively associated with DXE drivers of DXE volume 266. For instance, DXE signatures 268 may be utilized to respectively authenticate DXE drivers of DXE volume 266. Although non-volatile memory medium 170 is illustrated as including one PEI volume 262 and one DXE volume 266, non-volatile memory medium 170 may include one or more one PEI volumes 262 and/or one or more DXE volumes 266.

As illustrated, key manifest 222 may include a hash value 232. For example, hash value 232 may be a hash value of a root certificate public encryption key. For instance, hash value 232 may be a hash value a public encryption key of a root certificate 248. As shown, key manifest 222 may include a hash value 234. For example, hash value 234 may be a hash value of initial boot block 238. As illustrated, key manifest 222 may include a boot policy manifest signature 236. As shown, initial boot block 238 may include a root certificate verifier 240 and a subordinate certificate verifier 244. As illustrated, certificate store 246 may include root certificate 248. As shown, certificate store 246 may include subordinate certificate revocation public encryption key hash value list 242. As illustrated, certificate store 246 may include subordinate certificates 250A-250N. As shown, OID values 254 may include OID values 256A-256N.

In one or more embodiments, when IHS 110 boots, a key manifest 222 may be verified. For example, verifying key manifest 222 may include validating key manifest 222. In one or more embodiments, a secure boot system may include processor microcode. For example, the processor microcode may include an authentication module. For instance, the authentication module may authenticate key manifest 222. In one or more embodiments, the authentication module may be implemented by instructions executable by processor 120. In one or more embodiments, IHS 110 may receive a root certificate 240. In one example, IHS 110 may receive a root certificate 240 via a network. In another example, IHS 110 may receive a root certificate 240 via a non-volatile memory medium. For instance, IHS 110 may receive a root certificate 240 via a USB drive. As illustrated, root certificate 240 may be stored via certificate store 246. In one or more embodiments, root certificate 240 may be signed by a certificate authority. For example, the certificate authority may include an attribute authority.

In one or more embodiments, IHS 110 may receive a subordinate certificate revocation public encryption key hash value list 242. IHS 110 may receive a subordinate certificate revocation public encryption key hash value list 242 via a network. In another example, IHS 110 may receive a subordinate certificate revocation public encryption key hash value list 242 via a non-volatile memory medium. For example, IHS 110 may receive a subordinate certificate revocation public encryption key hash value list 242 via a USB drive. As illustrated, subordinate certificate revocation public encryption key hash value list 242 may be stored via certificate store 246. In one or more embodiments, if a hash value of a public encryption key of a subordinate certificate 250 matches a hash value of subordinate certificate revocation public encryption key hash value list 242, the subordinate certificate 250 may not be utilized and/or may be invalidated. In one or more embodiments, a boot policy manifest may include a certificate.

Figure 3A:
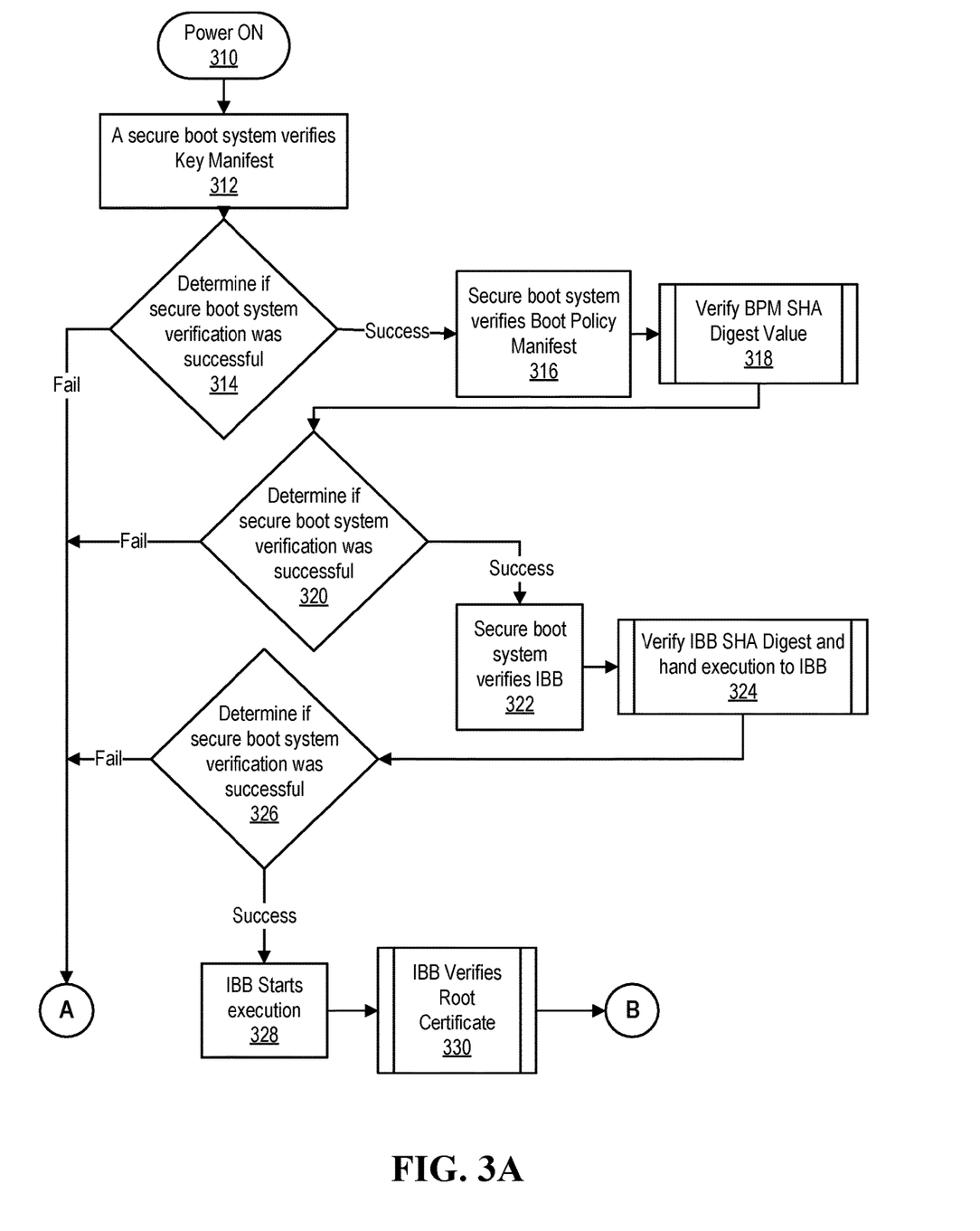
FIGS. 3A and 3B illustrate an example of a method of operating an information handling system, according to one or more embodiments.
Figure 3B:
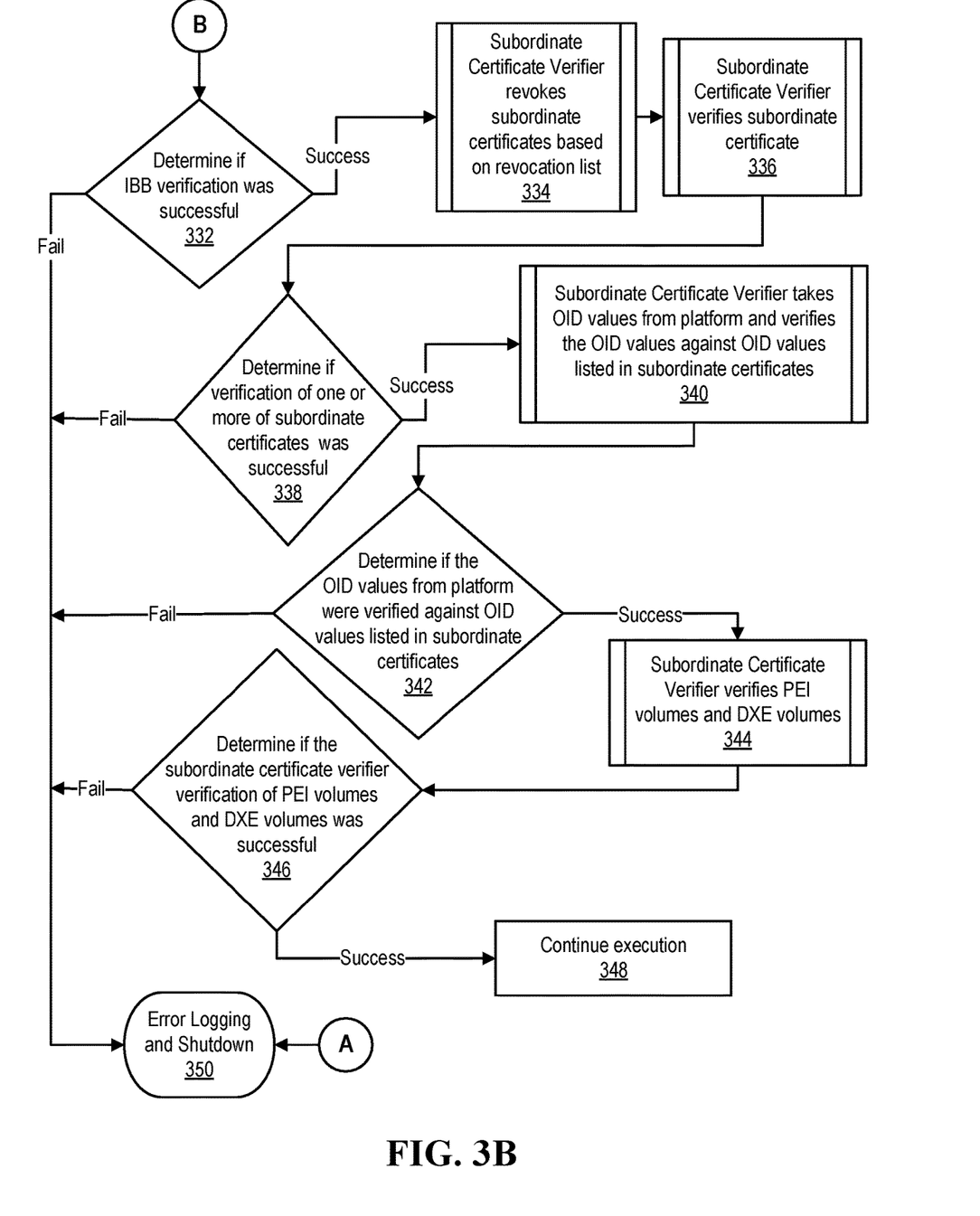

Turning now to FIGS. 3A and 3B, an example of a method of operating an information handling system is illustrated, according to one or more embodiments. At 310, an information handling system may be powered on. For example, IHS 110 may be powered on. At 312, a secure boot system may verify key manifest 222. At 314, it may be determined if the secure boot system verification of key manifest 222 was successful. If the secure boot system verification of key manifest 222 was not successful, one or more errors may be logged, and the information handling system may be shut down, at 350. If the secure boot system verification of key manifest 222 was successful, the secure boot system may verify boot policy manifest 228, at 316. Verifying boot policy manifest 228 may include verifying a boot policy manifest SHA digest value, at 318.

At 320, it may be determined if the secure boot system verification of boot policy manifest 228 was successful. If the secure boot system verification of boot policy manifest 228 was not successful, the method may proceed to 350, according to one or more embodiments. If the secure boot system verification of boot policy manifest 228 was successful, the secure boot system may verify initial boot block 238, at 322. Verifying initial boot block 238 may include verifying an initial boot block SHA digest value and handing execution to initial boot block 238, at 324.

At 326, it may be determined if the secure boot system verification of initial boot block 238 was successful. If the secure boot system verification of verify initial boot block 238 was not successful, the method may proceed to 350, according to one or more embodiments. If the secure boot system verification of verify initial boot block 238 was successful, initial boot block 238 may start execution, at 328.

At 330, initial boot block 238 may verify root certificate 248. In one or more embodiments, initial boot block 238 may a root certificate verifier 240. For example, root certificate verifier 240 may verify root certificate 248. At 332, it may be determined if initial boot block 238 verification of root certificate 248 was successful. If initial boot block 238 verification of root certificate 248 was not successful, the method may proceed to 350, according to one or more embodiments. If initial boot block 238 verification of root certificate 248 was successful, subordinate certificate verifier 244 may revoke one or more of subordinate certificates 250A-250N, at 334. For example, subordinate certificate verifier 244 may revoke one or more of subordinate certificates 250A-250N based at least on subordinate certificate revocation public encryption key hash value list 242. For instance, if a hash value of list hash value list 242 matches a hash value of a public encryption key of a subordinate certificate 250 of subordinate certificates 250A-250N, the subordinate certificate 250 may be revoked. In one or more embodiments, if the subordinate certificate 250 is revoked, an associated firmware volume 270 may not be utilized and/or may not be executed by processor 120.

At 336, subordinate certificate verifier 244 may verify one or more of subordinate certificates 250A-250N. For example, subordinate certificate verifier 244 one or more of subordinate certificates 250A-250N that were not revoked. At 338, it may be determined if verification of the one or more of subordinate certificates 250A-250N was successful. If verification of the one or more of subordinate certificates 250A-250N was not successful, the method may proceed to 350, according to one or more embodiments. If verification of the one or more of subordinate certificates 250A-250N was successful, subordinate certificate verifier 244 may take OID values 256 from IHS 110 and may verify OID values 256 against OID values listed in subordinate certificates 250A-250N.

At 342, it may be determined if the OID values 256 from IHS 110 were verified against OID values listed in subordinate certificates 250A-250N. If the OID values 256 from IHS 110 were not verified against OID values listed in subordinate certificates 250A-250N, the method may proceed to 350, according to one or more embodiments. If the OID values 256 from IHS 110 were verified against OID values listed in subordinate certificates 250A-250N, subordinate certificate verifier 244 may verify PEI volumes 264 and DXE volumes 266, at 344.

At 346, it may be determined if subordinate certificate verifier 244 verification of PEI volumes 264 and DXE volumes 266 was successful. If subordinate certificate verifier 244 verification of PEI volumes 264 and DXE volumes 266 was not successful, the method may proceed to 350, according to one or more embodiments. If subordinate certificate verifier 244 verification of PEI volumes 264 and DXE volumes 266 was successful, execution may be continued, at 348. For example, execution of instructions of PEI volumes 264 and DXE volumes 266 may continue.

Figure 4:
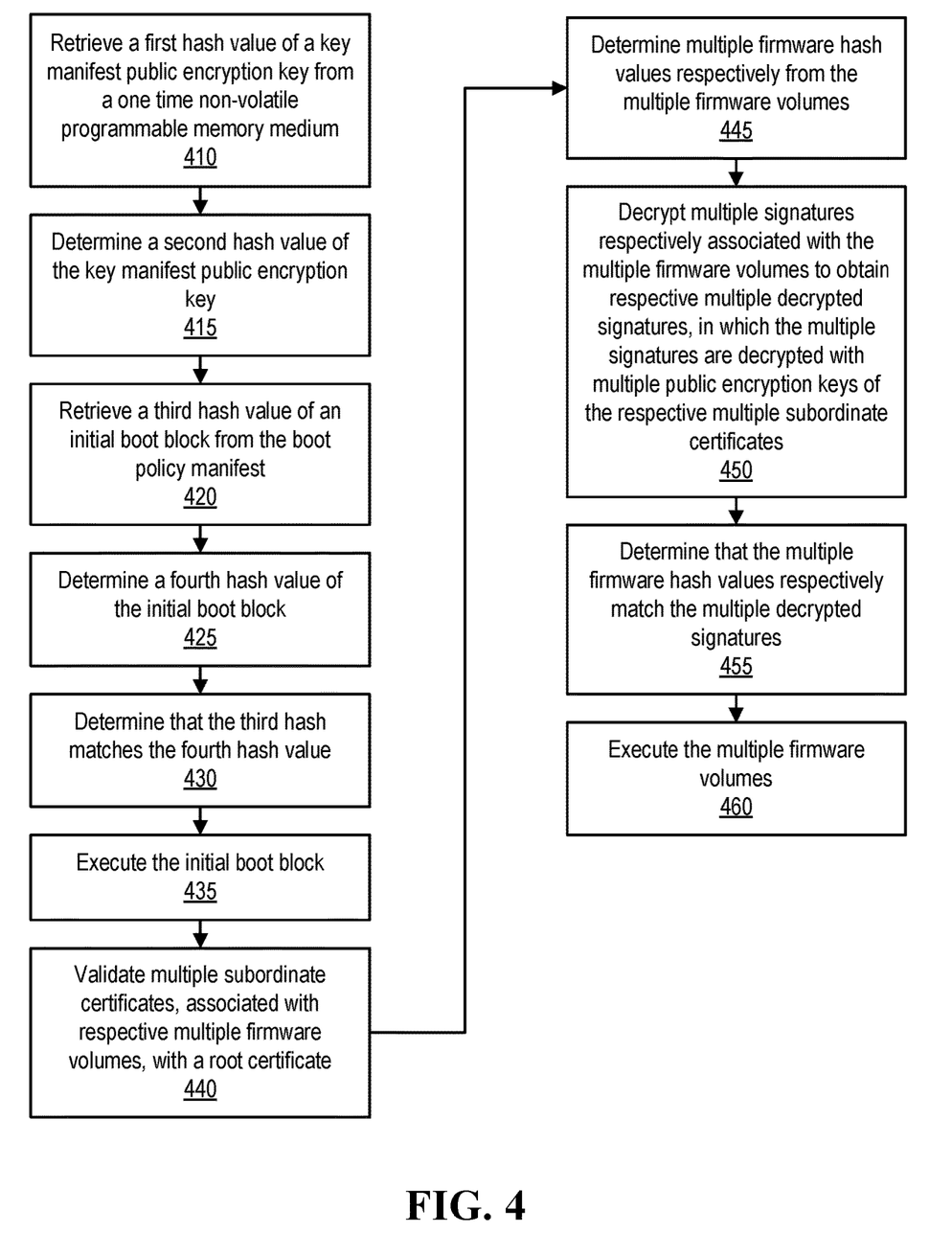
FIG. 4 illustrates another example of a method of operating an information handling system, according to one or more embodiments.

Turning now to FIG. 4, an example of a method of operating an information handling system is illustrated, according to one or more embodiments. At 410, a first hash value of a key manifest public encryption key may be retrieved from a one time programmable non-volatile memory medium. At 415, a second hash value of the key manifest public encryption key may be determined. At 420, a third hash value of an initial boot block may be retrieved from the boot policy manifest. In one or more embodiments, retrieving the third hash value of the initial boot block from the boot policy manifest may be performed after determining that the first hash value matches the second hash value.

At 425, a fourth hash value of the initial boot block may be determined. At 430, it may be determined that the third hash matches the fourth hash value. At 435, the initial boot block may be executed. In one or more embodiments, the initial boot block may be executed in response to determining that the third hash matches the fourth hash value. At 440, multiple subordinate certificates, associated with respective multiple firmware volumes, with a root certificate may be validated.

Figure 2C:
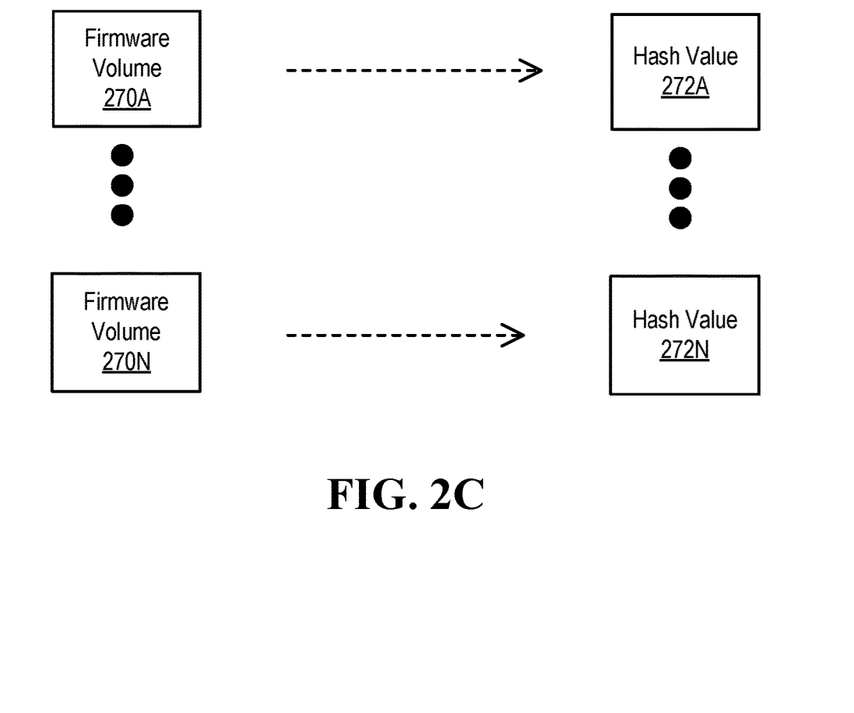
FIG. 2C illustrates an example of determining hash values of respective firmware volumes, according to one or more embodiments.

At 445, multiple firmware hash values may be respectively determined from the multiple firmware volumes. For example, hash values 272A-272N may be determined from firmware volumes 270A-270N, as illustrated in FIG. 2C. In one or more embodiments, firmware volumes 270A-270N may include one or more PEI volumes 264 and/or one or more DXE volumes 266, among others. Although not specifically illustrated, non-volatile memory medium 170 may include firmware volumes 270A-270N, according to one or more embodiments.

Figure 2D:
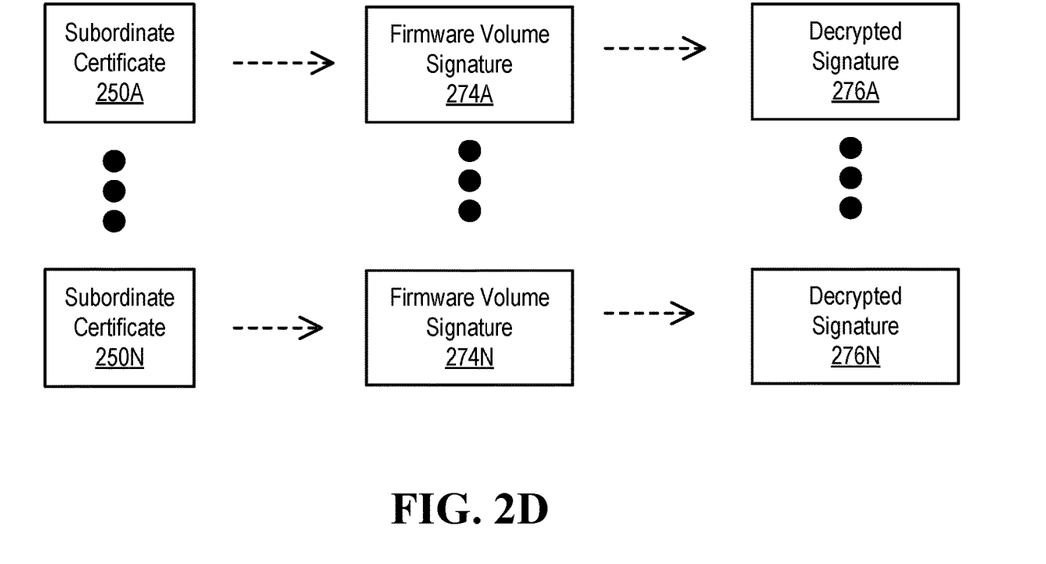
FIG. 2D illustrates an example of decrypting firmware volume signatures to obtain respective decrypted signatures, according to one or more embodiments.

At 450, multiple signatures respectively associated with the multiple firmware volumes may be decrypted to obtain respective multiple decrypted signatures, in which the multiple signatures are decrypted with multiple public encryption keys of the respective multiple subordinate certificates. For example, firmware volume signatures 274A-274N, respectively associated with firmware volumes 270A-270N, may be decrypted to obtain respective multiple decrypted signatures 276A-276N, as illustrated in FIG. 2D. For instance, firmware volume signatures 274A-274N may be decrypted with public encryption keys of respective subordinate certificates 250A-250N to obtain respective multiple decrypted signatures 276A-276N. Although not specifically illustrated, non-volatile memory medium may include firmware volume signatures 274A-274N, according to one or more embodiments.

At 455, it may be determined that the multiple firmware hash values respectively match the multiple decrypted signatures. For example, it may be determined that hash values 272A-272N respectively match the decrypted signatures 276A-276N. At 460, the multiple firmware volumes may be executed. For example, firmware volume signatures 274A-274N may be executed. In one or more embodiments, executing the multiple firmware volumes may be performed in response to determining that the multiple firmware hash values respectively match the multiple decrypted signatures.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a one time programmable non-volatile memory medium coupled to the at least one processor; and
   a memory medium, coupled to the at least one processor, that stores instructions executable by the at least one processor, which when executed by the at least one processor, cause the information handling system to:
      retrieve a first hash value of a key manifest public encryption key from the one time programmable non-volatile memory medium;
      determine a second hash value of the key manifest public encryption key;
      determine that the first hash value matches the second hash value;
      after determining that the first hash value matches the second hash value, retrieve a third hash value of an initial boot block from the boot policy manifest;
      determine a fourth hash value of the initial boot block;
      determine that the third hash matches the fourth hash value;
      in response to determining that the third hash matches the fourth hash value, execute the initial boot block;
      after executing the initial boot block:
         validate a plurality of subordinate certificates, associated with a respective plurality of firmware volumes, with a root certificate;
         fetch, for each subordinate certificate of the plurality of subordinate certificates, an object identifier (OID) value, stored by firmware, of a platform entity associated with the subordinate certificate;
         compare, for each subordinate certificate of the plurality of subordinate certificates, an OID value of the subordinate certificate with the OID value of the platform entity associated with the subordinate certificate;
         verify, based on the comparing, each of the subordinate certificates of the plurality of subordinate certificates;
         in response to verifying each of the subordinate certificates of the plurality of subordinate certificates, determine a plurality of firmware hash values respectively from the plurality of firmware volumes;
         decrypt a plurality of signatures respectively associated with the plurality of firmware volumes to obtain a respective plurality of decrypted signatures, wherein the plurality of signatures are decrypted with a plurality of public encryption keys of the respective plurality of subordinate certificates;
         determine that the plurality of firmware hash values respectively match the plurality of decrypted signatures; and
         in response to determining that the plurality of firmware hash values respectively match the plurality of decrypted signatures, execute the plurality of firmware volumes.

2. The information handling system of claim 1, wherein the instructions further cause the information handling system to:

before validating the plurality of subordinate certificates, associated with the respective plurality of firmware volumes, with the root certificate:
retrieve a fifth hash value of a root certificate public encryption key from the boot policy manifest;
determine a sixth hash value of the root certificate public encryption key; and
determine that the fifth hash matches the sixth hash value.

3. The information handling system of claim 2, wherein the instructions further cause the information handling system to:
before retrieving the fifth hash value of the root certificate public encryption key from the boot policy manifest:
retrieve a seventh hash value of a boot policy manifest public encryption key from the key manifest;
determine an eighth hash value of the boot policy manifest public encryption key; and
determine that the seventh hash value matches the eighth hash value.

4. The information handling system of claim 1, further comprising:
a platform controller hub coupled to the at least one processor;
wherein the platform controller hub includes the one time programmable non-volatile memory medium.

5. The information handling system of claim 1, wherein the instructions further cause the information handling system to:
write the hash value of the key manifest public encryption key to the one time programmable memory medium.

6. The information handling system of claim 1, wherein the instructions further cause the information handling system to:
validate a plurality of attributes of the plurality of subordinate certificates with a plurality of object identifiers.

7. The information handling system of claim 1, wherein the instructions further cause the information handling system to:
determine a plurality of public encryption key hash values of a plurality of public encryption keys of the plurality of subordinate certificates;
determine that at least one public encryption key hash value of the plurality of public encryption key hash values matches at least one hash value of a plurality of hash values of a revocation list; and
determine at least one subordinate certificate associated with the at least one hash value of the plurality of hash values of the revocation list;
wherein, to execute the plurality of firmware volumes, the instructions further cause the information handling system to execute the plurality of firmware volumes without executing at least one firmware volume of the plurality of firmware volumes associated with the at least one subordinate certificate associated with the at least one hash value of the plurality of hash values of the revocation list.

8. A method, comprising:
retrieving a first hash value of a key manifest public encryption key from a one time programmable memory medium of an information handling system;
determining a second hash value of the key manifest public encryption key;
determining that the first hash value matches the second hash value;
after the determining that the first hash value matches the second hash value, retrieving a third hash value of an initial boot block from the boot policy manifest;
determining a fourth hash value of the initial boot block;
determining that the third hash matches the fourth hash value;
in response to the determining that the third hash matches the fourth hash value, executing the initial boot block;
after the executing the initial boot block:
validating a plurality of subordinate certificates, associated with a respective plurality of firmware volumes, with a root certificate;
fetching, for each subordinate certificate of the plurality of subordinate certificates, an object identifier (OID) value, stored by firmware, of a platform entity associated with the subordinate certificate;
comparing, for each subordinate certificate of the plurality of subordinate certificates, an OID value of the subordinate certificate with the OID value of the platform entity associated with the subordinate certificate;
verifying, based on the comparing, each of the subordinate certificates of the plurality of subordinate certificates;
in response to verifying each of the subordinate certificates of the plurality of subordinate certificates, determining a plurality of firmware hash values respectively from the plurality of firmware volumes;
decrypting a plurality of signatures respectively associated with the plurality of firmware volumes to obtain a respective plurality of decrypted signatures, wherein the plurality of signatures are decrypted with a plurality of public encryption keys of the respective plurality of subordinate certificates;
determining that the plurality of firmware hash values respectively match the plurality of decrypted signatures; and
in response to the determining that the plurality of firmware hash values respectively match the plurality of decrypted signatures, executing the plurality of firmware volumes.

9. The method of claim 8, further comprising:
before the validating the plurality of subordinate certificates, associated with the respective plurality of firmware volumes, with the root certificate:
retrieving a fifth hash value of a root certificate public encryption key from the boot policy manifest;
determining a sixth hash value of the root certificate public encryption key; and
determining that the fifth hash matches the sixth hash value.

10. The method of claim 9, further comprising:
before the retrieving the fifth hash value of the root certificate public encryption key from the boot policy manifest:
retrieving a seventh hash value of a boot policy manifest public encryption key from the key manifest;
determining an eighth hash value of the boot policy manifest public encryption key; and
determining that the seventh hash value matches the eighth hash value.

11. The method of claim 8, wherein a platform controller hub of the information handling system includes the one time programmable memory medium.

12. The method of claim 8, further comprising:
writing the hash value of the key manifest public encryption key to the one time programmable non-volatile memory medium.

13. The method of claim 8, further comprising:
validating a plurality of attributes of the plurality of subordinate certificates with a plurality of object identifiers.

14. The method of claim 8, further comprising:
determining a plurality of public encryption key hash values of a plurality of public encryption keys of the plurality of subordinate certificates;
determining that at least one public encryption key hash value of the plurality of public encryption key hash values matches at least one hash value of a plurality of hash values of a revocation list; and
determining at least one subordinate certificate associated with the at least one hash value of the plurality of hash values of the revocation list;
wherein the executing the plurality of firmware volumes includes executing the plurality of firmware volumes without executing at least one firmware volume of the plurality of firmware volumes associated with the at least one subordinate certificate associated with the at least one hash value of the plurality of hash values of the revocation list.

15. A computer-readable non-transitory memory medium that includes instructions that, when executed by at least one processor of an information handling system, cause the information handling system to:
retrieve a first hash value of a key manifest public encryption key from a one time programmable non-volatile memory medium of the information handling system;
determine a second hash value of the key manifest public encryption key;
determine that the first hash value matches the second hash value;
after determining that the first hash value matches the second hash value, retrieve a third hash value of an initial boot block from the boot policy manifest;
determine a fourth hash value of the initial boot block;
determine that the third hash matches the fourth hash value;
in response to determining that the third hash matches the fourth hash value, execute the initial boot block;
after executing the initial boot block:
validate a plurality of subordinate certificates, associated with a respective plurality of firmware volumes, with a root certificate;
fetch, for each subordinate certificate of the plurality of subordinate certificates, an object identifier (OID) value, stored by firmware, of a platform entity associated with the subordinate certificate;
compare, for each subordinate certificate of the plurality of subordinate certificates, an OID value of the subordinate certificate with the OID value of the platform entity associated with the subordinate certificate;
verify, based on the comparing, each of the subordinate certificates of the plurality of subordinate certificates;
in response to verifying each of the subordinate certificates of the plurality of subordinate certificates, determine a plurality of firmware hash values respectively from the plurality of firmware volumes;
decrypt a plurality of signatures respectively associated with the plurality of firmware volumes to obtain a respective plurality of decrypted signatures, wherein the plurality of signatures are decrypted with a plurality of public encryption keys of the respective plurality of subordinate certificates;
determine that the plurality of firmware hash values respectively match the plurality of decrypted signatures; and
in response to determining that the plurality of firmware hash values respectively match the plurality of decrypted signatures, execute the plurality of firmware volumes.

16. The computer-readable non-transitory memory medium of claim 15, wherein the instructions further cause the information handling system to:
before validating the plurality of subordinate certificates, associated with the respective plurality of firmware volumes, with the root certificate:
retrieve a fifth hash value of a root certificate public encryption key from the boot policy manifest;
determine a sixth hash value of the root certificate public encryption key; and
determine that the fifth hash matches the sixth hash value.

17. The computer-readable non-transitory memory medium of claim 16, wherein the instructions further cause the information handling system to:
before retrieving the fifth hash value of the root certificate public encryption key from the boot policy manifest:
retrieve a seventh hash value of a boot policy manifest public encryption key from the key manifest;
determine an eighth hash value of the boot policy manifest public encryption key; and
determine that the seventh hash value matches the eighth hash value.

18. The computer-readable non-transitory memory medium of claim 15, wherein the instructions further cause the information handling system to:
write the hash value of the key manifest public encryption key to the one time programmable memory medium.

19. The computer-readable non-transitory memory medium of claim 15, wherein the instructions further cause the information handling system to:
validate a plurality of attributes of the plurality of subordinate certificates with a plurality of object identifiers.

20. The computer-readable non-transitory memory medium of claim 15, wherein the instructions further cause the information handling system to:
determine a plurality of public encryption key hash values of a plurality of public encryption keys of the plurality of subordinate certificates;
determine that at least one public encryption key hash value of the plurality of public encryption key hash values matches at least one hash value of a plurality of hash values of a revocation list; and
determine at least one subordinate certificate associated with the at least one hash value of the plurality of hash values of the revocation list;
wherein, to execute the plurality of firmware volumes, the instructions further cause the information handling system to execute the plurality of firmware volumes without executing at least one firmware volume of the plurality of firmware volumes associated with the at least one subordinate certificate associated with the at least one hash value of the plurality of hash values of the revocation list.

* * * * *